United States Patent
Kobayashi

(10) Patent No.: US 9,415,637 B2
(45) Date of Patent: Aug. 16, 2016

(54) PNEUMATIC TIRE

(71) Applicant: The Yokohama Rubber Co., LTD., Minato-ku, Tokyo (JP)

(72) Inventor: Hironori Kobayashi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 14/405,148

(22) PCT Filed: Jul. 29, 2013

(86) PCT No.: PCT/JP2013/070500
§ 371 (c)(1),
(2) Date: Dec. 2, 2014

(87) PCT Pub. No.: WO2014/030503
PCT Pub. Date: Feb. 27, 2014

(65) Prior Publication Data
US 2015/0165825 A1    Jun. 18, 2015

(30) Foreign Application Priority Data
Aug. 22, 2012  (JP) ................... 2012-183524

(51) Int. Cl.
*B60C 11/03* (2006.01)
*B60C 11/13* (2006.01)
*B60C 11/11* (2006.01)

(52) U.S. Cl.
CPC ......... *B60C 11/0309* (2013.04); *B60C 11/0306* (2013.04); *B60C 11/0316* (2013.04);
(Continued)

(58) Field of Classification Search
CPC ........ B60C 11/11; B60C 11/13; B60C 11/03; B60C 11/0306; B60C 11/0309; B60C 11/0316; B60C 11/1307; B60C 11/1369; B60C 11/0346; B60C 11/133; B60C 11/1338; B60C 2011/0358; B60C 2011/036; B60C 2011/0365; B60C 2011/0372; B60C 2200/06

USPC ............... 152/209.3, 209.9, 209.12, 209.13, 152/209.18; D12/592–597
See application file for complete search history.

(56) References Cited

U.S. PATENT DOCUMENTS 5,200,008 A * 4/1993 Enterline et al. ............ 156/110.1
5,361,815 A * 11/1994 Loser .................. B60C 11/0306
152/209.19

(Continued)

FOREIGN PATENT DOCUMENTS

DE    197 11 852    12/1997
JP    2007/331409    12/2007

(Continued)

OTHER PUBLICATIONS

International Search Report for International Application No. PCT/JP2013/070500 dated Aug. 27, 2013, 2 pages, Japan.

*Primary Examiner* — Eric Hug
(74) *Attorney, Agent, or Firm* — Thorpe North & Western

(57) ABSTRACT

The pneumatic tire includes a plurality of circumferential main grooves and extending in the tire circumferential direction, and a plurality of land portions partitioned by the circumferential main grooves. One row of the land portion includes a plurality of lug grooves that pass through the land portion in the tire width direction and is disposed at predetermined intervals in the tire circumferential direction, and a plurality of blocks partitioned by the lug grooves. Also, the lug groove includes a first lug groove portion and at least one second lug groove portion opening into one of the circumferential main grooves. Also, the groove width b of the first lug groove portion and the groove width B of the second lug groove portion have the relationships of 2.0 mm≤b≤5.0 mm, 5.0 mm≤B≤10.0 mm, and b<B.

24 Claims, 10 Drawing Sheets

(52) U.S. Cl.
CPC ............ B60C11/11 (2013.01); B60C 11/1307 (2013.04); *B60C 11/1369* (2013.04); *B60C 2011/036* (2013.04); *B60C 2011/0346* (2013.04); *B60C 2011/0365* (2013.04); *B60C 2011/0372* (2013.04); *B60C 2011/0381* (2013.04); *B60C 2011/1209* (2013.04); *B60C 2011/133* (2013.04); *B60C 2011/1338* (2013.04); *B60C 2200/06* (2013.04)

(56) References Cited

U.S. PATENT DOCUMENTS

| | | | | |
|---|---|---|---|---|
| D380,181 S | * | 6/1997 | Maruyama | D12/595 |
| D384,011 S | * | 9/1997 | Kawamata | D12/597 |
| 5,891,276 A | * | 4/1999 | Takahashi | B60C 11/13 152/209.15 |
| D425,457 S | * | 5/2000 | Gillard | D12/596 |
| D426,498 S | * | 6/2000 | Ebiko | D12/566 |
| 6,736,175 B2 | * | 5/2004 | Carra | B60C 11/11 152/209.18 |
| 8,851,130 B2 | | 10/2014 | Shimizu | |
| 2001/0022209 A1 | * | 9/2001 | Chaen et al. | 152/151 |
| 2007/0199633 A1 | | 8/2007 | Hayashi | |
| 2009/0229721 A1 | * | 9/2009 | Ikeda | B60C 11/0306 152/209.18 |
| 2012/0291934 A1 | * | 11/2012 | Iwabuchi | B60C 11/0306 152/209.18 |
| 2012/0298269 A1 | * | 11/2012 | Mathonet | B60C 11/0306 152/209.16 |
| 2013/0000805 A1 | * | 1/2013 | Oodaira | 152/209.18 |

FOREIGN PATENT DOCUMENTS

| | | |
|---|---|---|
| JP | 2008/279976 | 11/2008 |
| WO | WO 2006/001202 | 1/2006 |
| WO | WO 2008/146851 | 12/2008 |

* cited by examiner

| | Conventional Example 1 | Conventional Example 2 | Conventional Example 3 | Conventional Example 4 | Working Example 1 | Working Example 2 |
|---|---|---|---|---|---|---|
| b [mm] | 0.5 | 0.5 | 7.0 | 7.0 | 2.0 | 3.5 |
| B [mm] | 0.5 | 0.5 | 7.0 | 7.0 | 8.0 | 8.0 |
| α [deg] | 15 | 45 | 45 | 75 | 20 | 20 |
| D/W | 0.7 | 0.7 | 0.7 | 0.7 | 0.7 | 0.7 |
| β [deg] | 30 | 30 | 30 | 30 | 30 | 30 |
| Rolling resistance performance | 115 | 114 | 100 | 100 | 112 | 110 |
| Snow braking performance | 100 | 100 | 111 | 111 | 112 | 112 |
| Uneven wear resistance performance | 113 | 114 | 103 | 100 | 109 | 109 |

FIG. 9A

| | Working Example 3 | Comparative Example 1 | Working Example 4 | Working Example 5 | Comparative Example 2 |
|---|---|---|---|---|---|
| b[mm] | 5.0 | 3.5 | 3.5 | 3.5 | 3.5 |
| B[mm] | 8.0 | 3.0 | 5.0 | 10.0 | 12.0 |
| α[deg] | 20 | 20 | 20 | 20 | 20 |
| D/W | 0.7 | 0.7 | 0.7 | 0.7 | 0.7 |
| β[deg] | 30 | 30 | 30 | 30 | 30 |
| Rolling resistance performance | 108 | 110 | 110 | 110 | 110 |
| Snow braking performance | 112 | 101 | 105 | 110 | 115 |
| Uneven wear resistance performance | 109 | 110 | 112 | 107 | 98 |

FIG. 9B

|  | Working Example 6 | Working Example 7 | Working Example 8 | Working Example 9 | Working Example 10 | Working Example 11 |
|---|---|---|---|---|---|---|
| b[mm] | 2.0 | 3.5 | 5.0 | 3.5 | 3.5 | 3.5 |
| B[mm] | 8.0 | 8.0 | 8.0 | 8.0 | 8.0 | 8.0 |
| α[deg] | 25 | 45 | 65 | 45 | 45 | 45 |
| D/W | 0.7 | 0.7 | 0.7 | 0.1 | 0.2 | 0.4 |
| β[deg] | 30 | 30 | 30 | 30 | 30 | 30 |
| Rolling resistance performance | 115 | 116 | 114 | 108 | 110 | 112 |
| Snow braking performance | 112 | 112 | 112 | 116 | 115 | 114 |
| Uneven wear resistance performance | 109 | 109 | 109 | 105 | 108 | 110 |

FIG. 10A

| | Working Example 12 | Working Example 13 | Working Example 14 | Working Example 15 | Working Example 16 |
|---|---|---|---|---|---|
| b [mm] | 3.5 | 3.5 | 3.5 | 3.5 | 3.5 |
| B [mm] | 8.0 | 8.0 | 8.0 | 8.0 | 8.0 |
| α [deg] | 45 | 45 | 45 | 45 | 45 |
| D/W | 0.6 | 0.4 | 0.4 | 0.4 | 0.4 |
| β [deg] | 30 | 0 | 10 | 25 | 40 |
| Rolling resistance performance | 114 | 112 | 112 | 112 | 112 |
| Snow braking performance | 113 | 114 | 114 | 114 | 114 |
| Uneven wear resistance performance | 111 | 114 | 113 | 111 | 107 |

FIG. 10B

PNEUMATIC TIRE

TECHNICAL FIELD

The present technology relates to a pneumatic tire, and more particularly relates to a pneumatic tire that can improve the snow braking performance and rolling resistance performance.

BACKGROUND

In radial tires for heavy loads mounted on trucks and buses and the like, a block pattern is adopted in order to increase the braking performance (snow braking performance) on snow-covered road surfaces. On the other hand, in the case of radial tires for heavy loads, there is a demand to reduce the rolling resistance in order to improve the fuel economy. Generally, the snow braking performance is excellent in the case of tread patterns based on ribs, and the fuel economy is excellent in the case of tread patterns based on blocks. Therefore, the two have conflicting properties.

Note that as a conventional pneumatic tire having a block pattern, the technology described in International Patent Publication No. WO/2008/146851 is known.

SUMMARY

The present technology provides a pneumatic tire that is capable of improving the tire snow braking performance and the rolling resistance performance.

The pneumatic tire according to the present technology includes a plurality of circumferential main grooves extending in the tire circumferential direction; and a plurality of land portions partitioned by the circumferential main grooves, wherein the land portion in at least one row includes a plurality of lug grooves that pass through the land portion in the tire width direction and is disposed at predetermined intervals in the tire circumferential direction, and a plurality of blocks partitioned by the plurality of lug grooves, the lug grooves include a first lug groove portion, and at least one second lug groove portion that opens to one of the circumferential main grooves, and, the groove width b of the first lug groove portion and the groove width B of the second lug groove portion have the relationships of 2.0 mm≤b≤5.0 mm and b<B, and are within ranges such that during ground contact of the blocks, the first lug groove portions are closed and the second lug groove portions are not closed but remain open.

In the pneumatic tire according to the present technology, the first lug groove portion has the narrow groove width b, so when the blocks contact the ground, the first lug groove portion is closed and the blocks become connected in the tire circumferential direction. Accordingly, the stiffness in the tire circumferential direction of the center land portion increases, and the tire rolling resistance is reduced. On the other hand, the wide second lug groove portion is disposed at the edge of the center land portion, so the edge component of the center land portion is ensured, and the tire snow braking performance is ensured. Accordingly, there is the advantage that both the tire rolling resistance performance and the snow braking performance are achieved.

BRIEF DESCRIPTION OF THE DRAWING(S)

FIGS. 9A-9B include a table showing results of performance testing of pneumatic tires according to embodiments of the present technology.

FIGS. 10A-10B include a table showing results of performance testing of pneumatic tires according to embodiments of the present technology.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.

Pneumatic Tire

Figure 1:
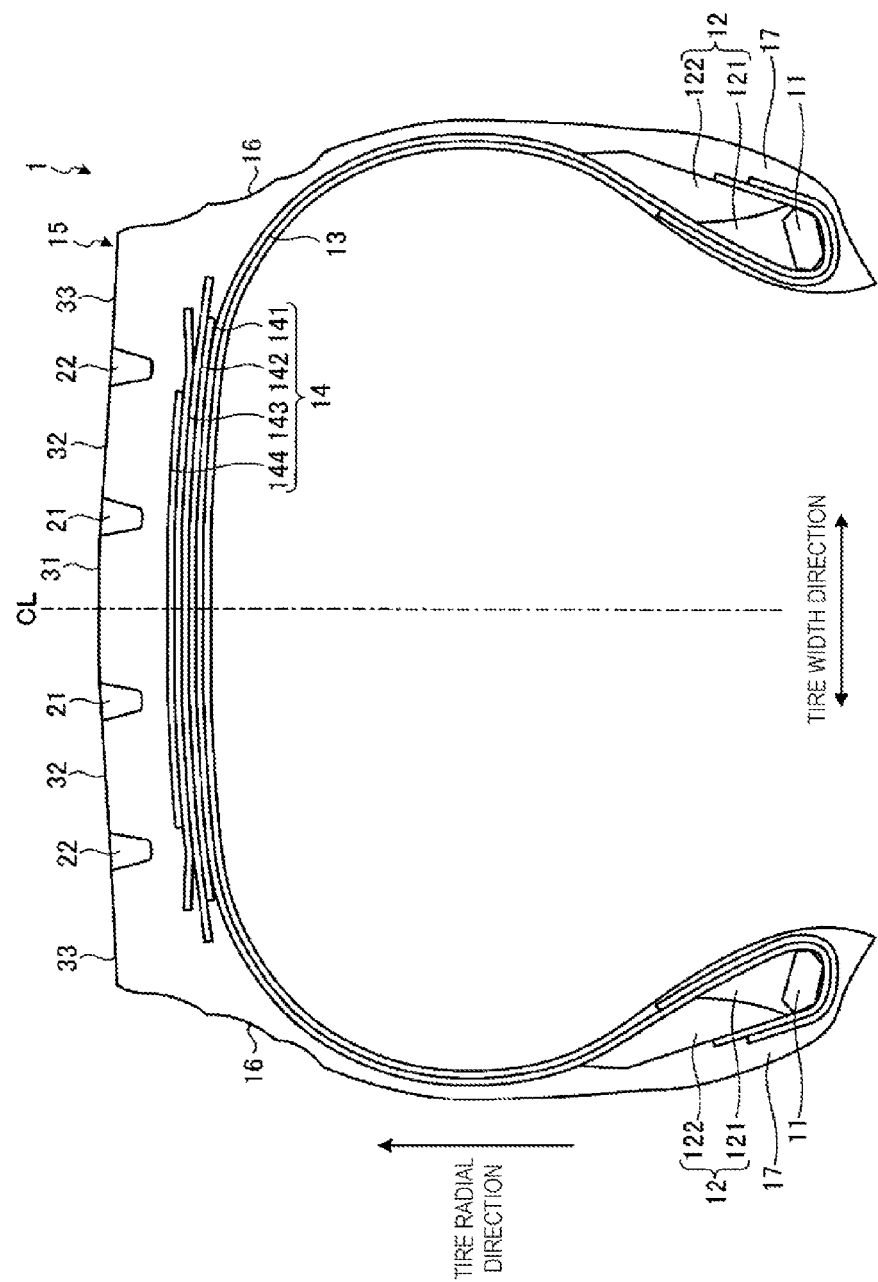
FIG. 1 is a cross-sectional view in a tire meridian direction illustrating a pneumatic tire according to an embodiment of the present technology.

FIG. 1 is a cross-sectional view in a tire meridian direction illustrating a pneumatic tire according to an embodiment of the present technology. FIG. 1 illustrates a region on one side of a cross-section in the tire radial direction. As an example of a pneumatic tire, FIG. 1 illustrates a radial tire for heavy loads mounted on a steering axle of a truck, bus, and the like for long-distance transport. Note that the symbol CL refers to a tire equator plane. A tire width direction refers to a direction parallel to a tire rotational axis (not illustrated), and the tire radial direction refers to the direction perpendicular to the tire rotational axis.

The pneumatic tire 1 has an annular structure centered around the tire rotational axis, and includes a pair of bead cores 11, 11, a pair of bead fillers 12, 12, a carcass layer 13, a belt layer 14, a tread rubber 15, a pair of side wall rubbers 16, 16, and a pair of rim cushion rubbers 17, 17 (see FIG. 1).

The pair of bead cores 11, 11 have annular structures and constitute cores of left and right bead portions. The pair of bead fillers 12, 12 are formed from a lower filler 121 and an upper filler 122, and are disposed on a periphery of each of the pair of bead cores 11, 11 in the tire radial direction so as to reinforce the bead portions.

The carcass layer 13 stretches between the left and right side bead cores 11 and 11 in toroidal form, forming a framework for the tire. Additionally, both ends of the carcass layer 13 are folded from an inner side in a tire width direction toward an outer side in the tire width direction and fixed so as to wrap around the bead cores 11 and the bead fillers 12. Also, the carcass layer 13 is constituted by a plurality of carcass cords formed from steel or organic fibers (e.g. nylon, polyester, rayon, or the like) covered by a coating rubber and subjected to a rolling process, and has a carcass angle (inclination angle of the carcass cord in a fiber direction with respect to the tire circumferential direction), as an absolute value, of not less than 85° and not more than 95°.

The belt layer 14 is formed by laminating a plurality of belt plies 141 to 144, and is disposed to extend over a periphery of the carcass layer 13. The belt plies 141 to 144 are configured from, for example, a large angle belt 141, a pair of cross belts 142, 143, and a belt cover 144. Also, each of the belt plies 141 to 144 is configured by a plurality of belt cords formed from steel or organic fibers, covered by coating rubber, and subjected to a rolling process, having a predetermined belt angle (angle of inclination of belt cord fiber direction with respect to the tire circumferential direction).

The tread rubber 15 is disposed on an outer circumference in the tire radial direction of the carcass layer 13 and the belt layer 14, and forms a tread portion of the tire. The pair of side wall rubbers 16, 16 is disposed on each outer side of the carcass layer 13 in the tire width direction, so as to form left and right sidewall portions of the tire. The pair of rim cushion rubbers 17 and 17 is disposed on each outer side of the left and right bead cores 11 and 11 and the bead fillers 12 and 12 in the tire width direction so as to form left and right bead portions of the tire.

Figure 2:
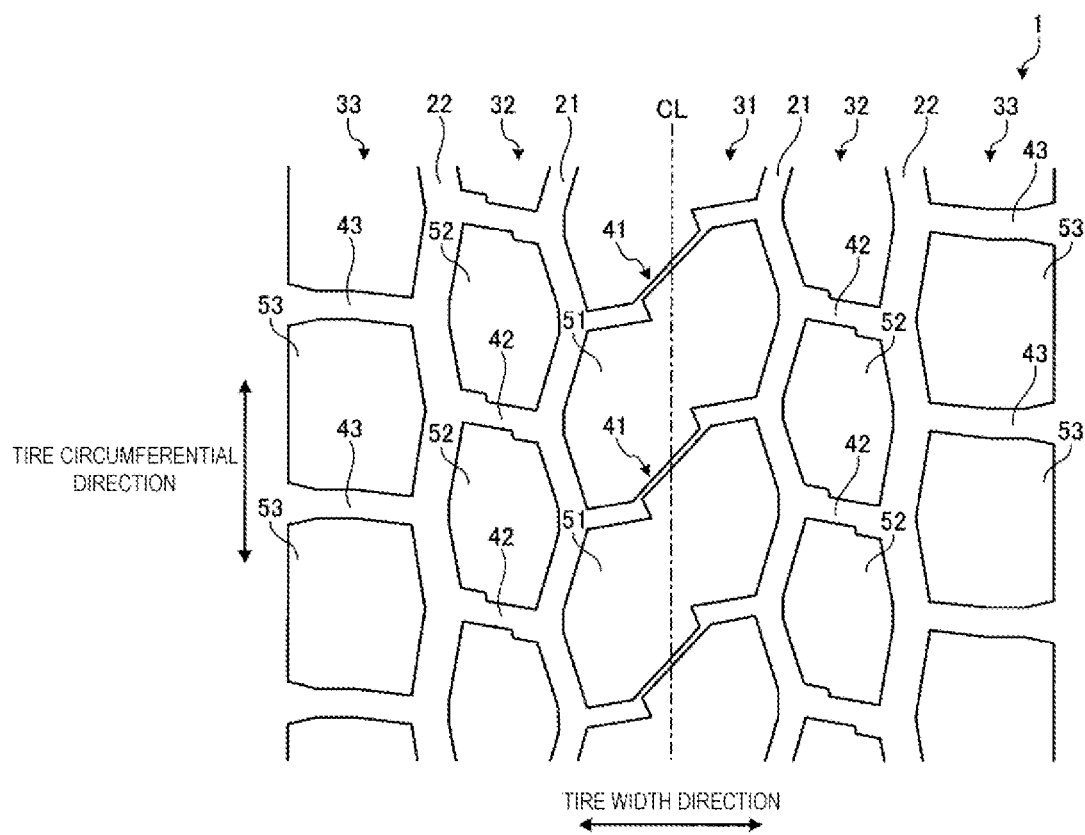
FIG. 2 is a plan view illustrating a tread surface of the pneumatic tire depicted in FIG. 1.

FIG. 2 is a plan view illustrating a tread surface of the pneumatic tire depicted in FIG. 1. FIG. 2 illustrates a tread pattern for an all weather tire. The tire circumferential direction is the direction around the tire rotational axis.

The pneumatic tire 1 includes a plurality of circumferential main grooves 21, 22 extending in the tire circumferential direction, a plurality of land portions 31 to 33 partitioned by the circumferential main grooves 21, 22, and a plurality of lug grooves 41 to 43 disposed in the land portions 31 to 33 (see FIG. 2).

Circumferential main groove refers to a circumferential groove having a groove width of not less than 5.0 mm. Moreover, "lug grooves" refers to lateral grooves having a groove width of 2.0 mm or greater. When measuring these groove widths, the notch and the chamfered portion formed in the groove opening portion are omitted. Lateral grooves or slits having a groove width of less than 2.0 mm are classified as sipes.

For example, the pneumatic tire 1 is provided with four circumferential main grooves 21, 22 having a zigzag shape in the configuration in FIG. 2, disposed so as to have left-right symmetry with respect to the tire equatorial plane CL. Additionally, one center land portion 31, a pair of left and right second land portions 32, 32, and a pair of left and right shoulder land portions 33, 33 are partitioned by these circumferential main grooves 21, 22. Also, all the land portions 31 to 33 have a plurality of lug grooves 41 to 43 respectively that extend in the tire width direction. Also, the lug grooves 41 to 43 have an open structure that passes through the land portions 31 to 33 in the tire width direction, and are arranged with a predetermined interval in the tire circumferential direction. Accordingly, all the land portions 31 to 33 are rows of blocks divided into a plurality of blocks 51 to 53.

[First Lug Groove Portion and Second Lug Groove Portion of the Lug Grooves]

In radial tires for heavy loads mounted on trucks and buses and the like, a block pattern is adopted in order to increase the braking performance (snow braking performance) on snow-covered road surfaces. On the other hand, in the case of radial tires for heavy loads, there is a demand to reduce the rolling resistance in order to improve the fuel economy. Generally, the snow braking performance is excellent in the case of tread patterns based on ribs, and the fuel economy is excellent in the case of tread patterns based on blocks. Therefore, the two have conflicting properties.

Therefore, the following configuration has been adopted on this pneumatic tire 1 in order to achieve both snow braking performance and fuel economy.

Figure 3:
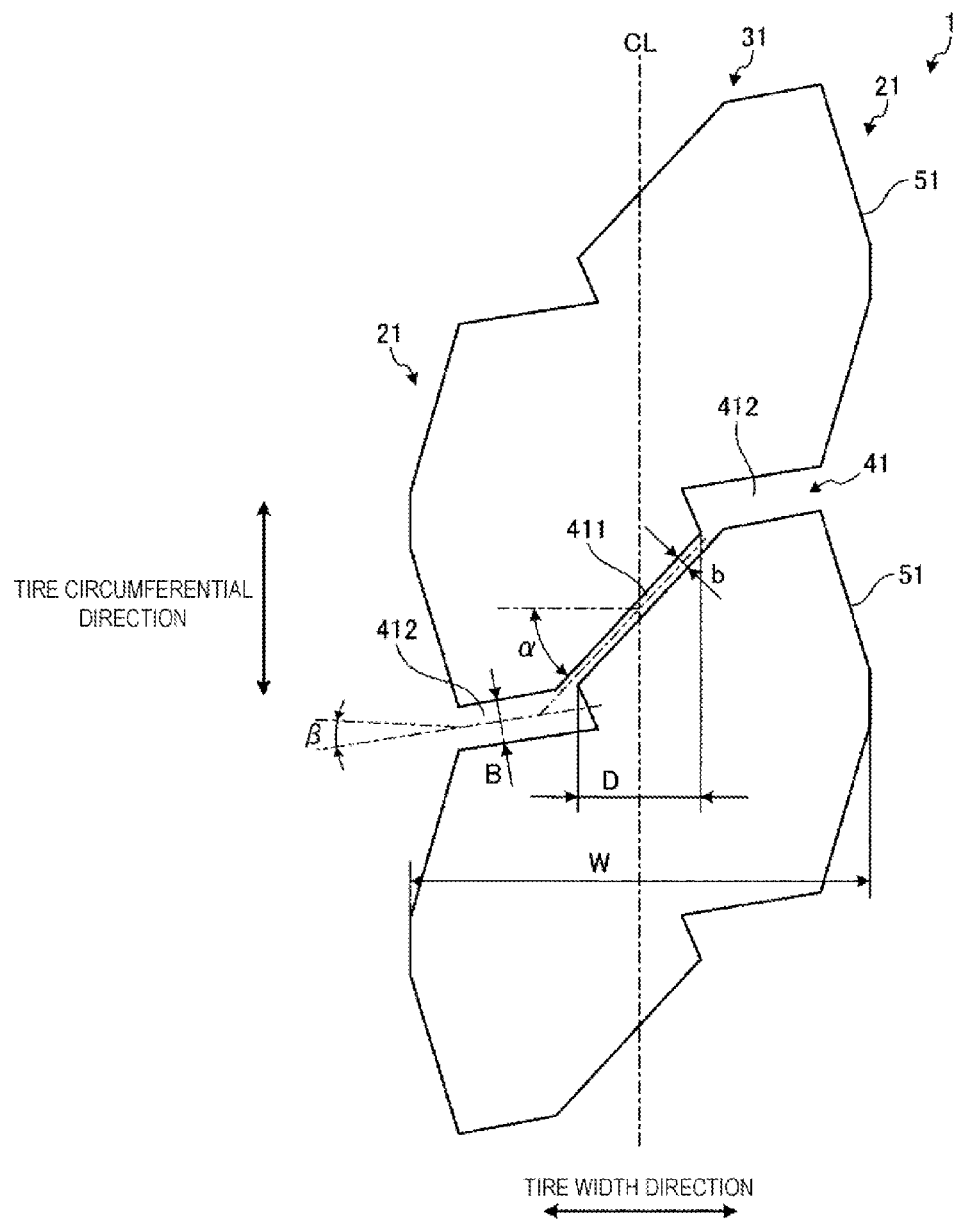
FIG. 3 is an explanatory view illustrating the main parts of the pneumatic tire depicted in FIG. 2.

FIG. 3 is an explanatory view illustrating the main parts of the pneumatic tire depicted in FIG. 2. In FIG. 3, a pair of blocks 51, 51 that are adjacent in the center land portion 31 and a single lug groove 41 that is interposed between these blocks 51, 51 have been extracted.

In the pneumatic tire 1, as illustrated in FIG. 2, the center land portion 31 includes the plurality of lug grooves 41 that pass through the center land portion 31 in the tire width direction and are disposed at predetermined intervals in the tire circumferential direction, and the plurality of blocks 51 partitioned by the lug grooves 41. Also, a single block 51 is partitioned by a pair of circumferential main grooves 21, 21 that are adjacent in the tire width direction, and a pair of lug grooves 41, 41 that are adjacent in the tire circumferential direction. Also, the center land portion 31 is formed by these blocks 51 arranged as a row in the tire circumferential direction. Therefore, a single block 51 faces the left and right circumferential main grooves 21, 21 that partition the center land portion 31, and, the plurality of blocks 51 is arranged as a row in a straight line in the tire circumferential direction along the left and right circumferential main grooves 21, 21.

Also, as illustrated in FIG. 3, the lug grooves 41 of the center land portion 31 include a first lug groove portion 411 and a second lug groove portion 412.

The first lug groove portions 411 are arranged intersecting the center line of each block 51 of the center land portion 31. The center line of the block 51 is the straight line passing through the center point of the left and right maximum width positions of the block 51, and is parallel to the tire circumferential direction. In the configuration in FIGS. 2 and 3, the center line of the blocks 51 is disposed on the tire equatorial plane CL.

Also, the groove width b of the first lug groove portion 411 is within the range of $2.0 \text{ mm} \le b \le 5.0 \text{ mm}$. Also, groove width b of the first lug groove portion 411 is set within the range such that the first lug groove portion 411 closes upon tire ground contact when the block 51 contacts the ground. Also, the groove width b of the first lug groove portion 411 is measured at the road contact surface of the land portion 31 when a new tire is assembled on a standard rim, inflated with the prescribed internal pressure, under no load conditions.

Ground contact conditions of the block 51 refers to the condition in which the tire contacts the surface of a flat plate when the tire is assembled on a standard rim, filled to the prescribed internal pressure, placed perpendicularly with respect to the flat plate in the static state, and loaded with a load corresponding to the prescribed load.

Herein, "standard rim" refers to an "applicable rim" defined by the Japan Automobile Tyre Manufacturers Association (JATMA), a "design rim" defined by the Tire and Rim Association (TRA), or a "measuring rim" defined by the European Tyre and Rim Technical Organisation (ETRTO). "Regular inner pressure" refers to "maximum air pressure" stipulated by JATMA, a maximum value in "tire load limits at various cold inflation pressures" defined by TRA, and "inflation pressures" stipulated by ETRTO. Note that "regular load" refers to "maximum load capacity" stipulated by JATMA, a maximum value in "tire load limits at various cold inflation pressures" defined by TRA, and "load capacity" stipulated by ETRTO. However, with JATMA, in the case of passenger car tires, the regular internal pressure is an air pressure of 180 kPa, and the regular load is 88% of the maximum load capacity.

Also, preferably, the angle of inclination α of the first lug groove portion 411 with respect to the tire width direction is within the range of 25 (deg)≤α≤65 (deg). The angle of inclination α is measured as the absolute value of the angle between the groove center line of the first lug groove portion 411 and the tire rotational axis.

Also, the distance D in the tire width direction of the first lug groove portion 411 and the width W of the block 51 have the relationship of 0.2≤D/W≤0.6. The width W of the block 51 is measured as the maximum width in the tire width direction of the block 51, when the tire is assembled on a standard rim and inflated with the prescribed internal pressure, under no load conditions.

The second lug groove portion 412 opens into one of the circumferential main grooves 21 from among the left and right circumferential main grooves 21, 21 that partition the center land portion 31. Therefore, the second lug groove portion 412 is configured as the opening of the lug groove 41 into the circumferential main groove 21.

Also, the groove width B of the second lug groove portion 412 is within the range of 5.0 mm≤B≤10.0 mm. Also, the groove width b of the first lug groove portion 411 and the groove width B of the second lug groove portion 412 have the relationship of b<B. Therefore, the groove width B of the second lug groove portion 412 is wider than the groove width b of the first lug groove portion 411. Accordingly, the opening of the lug groove 41 into the circumferential main groove 21 is widened by the second lug groove portion 412. Also, the groove width B of the second lug groove portion 412 is set within the range such that the second lug groove portion 412 is not closed but remains open when the block 51 contacts the ground upon tire ground contact. Also, the groove width B of the second lug groove portion 412 is measured at the road contact surface of the land portion 31 when a new tire is assembled on a standard rim and inflated with the prescribed internal pressure under no load conditions.

Also, a single lug groove 41 includes the first lug groove portion 411 and the second lug groove portion 412 and is configured by connecting them. Also, the connecting portion between the first lug groove portion 411 and the second lug groove portion 412 may connect the narrower first lug groove portion 411 to the wider second lug groove portion 412 by widening the groove width in a step (see FIG. 3), or may connect the first lug groove portion 411 to the second lug groove portion 412 by gradually widening the groove width b (not illustrated on the drawings).

Also, the angle of inclination β of the second lug groove portion 412 with respect to the tire width direction is within the range of 0 (deg)≤β≤25 (deg). Therefore, the angle of inclination β of the second lug groove portion 412 is less than or equal to the angle of inclination α of the first lug groove portion. The angle of inclination β is measured as the absolute value of the angle between the groove center line of the second lug groove portion 412 and the tire rotational axis.

For example, in the configuration in FIG. 3, the lug groove 41 is configured from the first lug groove portion 411 and a pair of second lug groove portions 412, 412. Also, the first lug groove portion 411 is disposed in the center of the land portion 31, and intersects with the tire equatorial plane CL. Also, the first lug groove portion 411 has a straight line form, and has the groove width b as described above, the angle of inclination α with respect to the tire width direction, and a predetermined distance D in the tire width direction. Also, the pair of second lug groove portions 412, 412 is configured as the left and right openings of the lug groove 41 disposed on the left and right edges of the land portion 31, also, the pair of second lug groove portions 412, 412 are each connected to one of the two ends of the first lug groove portion 411. Also, the second lug groove portions 412, 412 have a straight line form, each has the groove width B as described above, and a predetermined angle of inclination β with respect to the tire width direction. Also, the angle of inclination α of the first lug groove portion 411 and the angle of inclination β of the second lug groove portions 412, 412 have the relationship of α>β, and, the first lug groove portion 411 and the second lug groove portion 412, 412 are inclined in the same direction with respect to the tire width direction. Accordingly, the lug groove 41 has a bent shape overall, and has a shape with a narrow groove width in the first lug groove portion 411 in the center, and a broad groove width at the openings into the left and right circumferential main grooves 21, 21.

Figure 4:
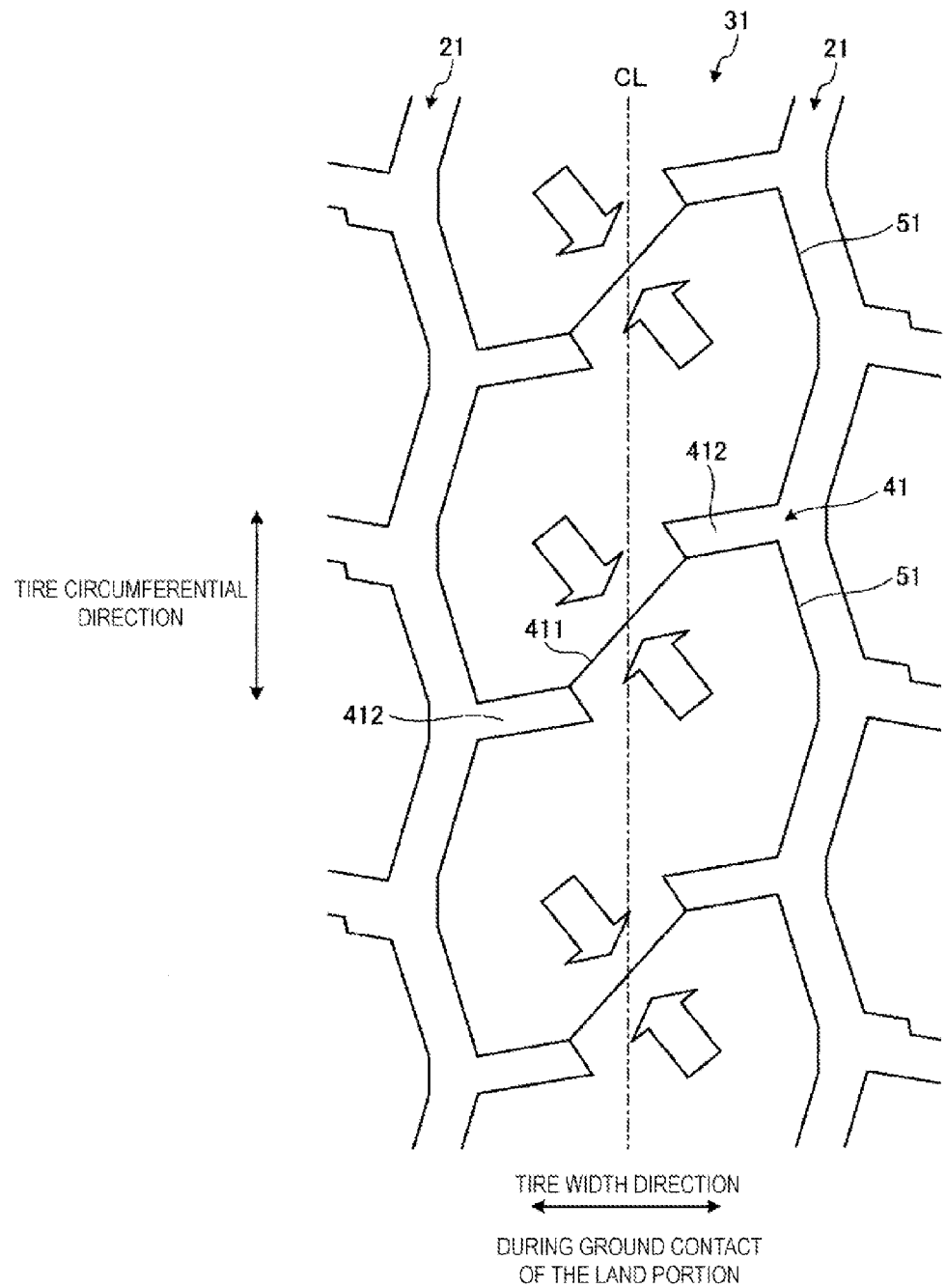
FIG. 4 is an explanatory view illustrating the effect of the pneumatic tire depicted in FIG. 1.

FIG. 4 is an explanatory view illustrating the effect of the pneumatic tire depicted in FIG. 1. FIG. 4 depicts the state of the blocks 51 and the lug grooves 41 during ground contact of the center land portion 31.

In this pneumatic tire 1, when the center land portion 31 contacts the ground, the blocks 51, 51 deform in compression in the tire circumferential direction and the tire width direction due to the ground contact pressure. Therefore, the lug groove 41 becomes narrow, and the blocks 51 connect in the tire circumferential direction due to closure of the first lug groove portion 411 by mutual contact of the opposing groove wall surfaces of the first lug groove portion 411. Accordingly, the stiffness in the tire circumferential direction of the center land portion 31 increases, and the tire rolling resistance is reduced. On the other hand, the second lug groove portion 412 has a wider structure than the first lug groove portion 411, and the second lug groove portion 412 is disposed on the edge of the center land portion 31, so the edge component of the center land portion 31 is ensured, and the tire snow braking performance is ensured. Accordingly, the tire rolling resistance performance and the snow braking performance are both achieved.

In the configuration of FIG. 2, the center land portion 31 on the tire equatorial plane CL from among the five rows of land portions 31 to 33 is provided with the lug grooves 41 having the first lug groove portion 411 and the second lug groove portion 412. This configuration is preferable because the tire snow braking performance is effectively improved.

However, this is not a limitation, for example, in a configuration (not illustrated on the drawings) in which a circumferential main groove is disposed on the tire equatorial plane CL, the left and right land portions partitioned by the circumferential main grooves may have the first lug groove portion 411 and the second lug groove portions 412 as described above (not illustrated on the drawings). Also, some or all of the land portions from among the left and right second land portions 32, 32 and the left and right shoulder portions 33, 33 may have the first lug groove portion 411 and the second lug groove portions 412 as described above (not illustrated on the drawings).

Also, in the configuration in FIG. 2, the circumferential main grooves 21 that partition the center land portion 31 (the land portion that includes the lug groove 41 having the first lug groove portion 411 and the second lug groove portion 412) extends while bending in the tire circumferential direction into a zigzag shape. In this configuration, the edge component of the center land portion 31 is increased, which is desirable in terms of improving the tire snow performance. However, this is not a limitation, and the circumferential main grooves 21 may have a straight shape (not illustrated on the drawings).

Also, in the configuration in FIG. 3, the first lug groove portion 411 and the second lug groove portion 412 have a straight line shape. However, this is not a limitation, and the first lug groove portion 411 and the second lug groove portion 412 may have a circular arc shape, an S shape, a zigzag shape, and the like (not illustrated on the drawings). Also, the corner of the block 51 at the position of the intersection between the second lug groove portion 412 and the circumferential main groove 21 may have a radiused chamfer or a C-shaped chamfer (not illustrated on the drawings).

Also, in the pneumatic tire 1, preferably, the groove depth H1 (not illustrated on the drawings) of the circumferential main grooves 21, 21 that partition the center land portion 31 is in the range of 12 mm≤H. The upper limit on the groove depth of the circumferential main grooves 21 is restricted by the wall thickness of the tread rubber 15. Also, the groove depth H1 of the circumferential main grooves 21 is measured as the maximum groove depth excluding any raised bottom portions or the like.

Figure 5:
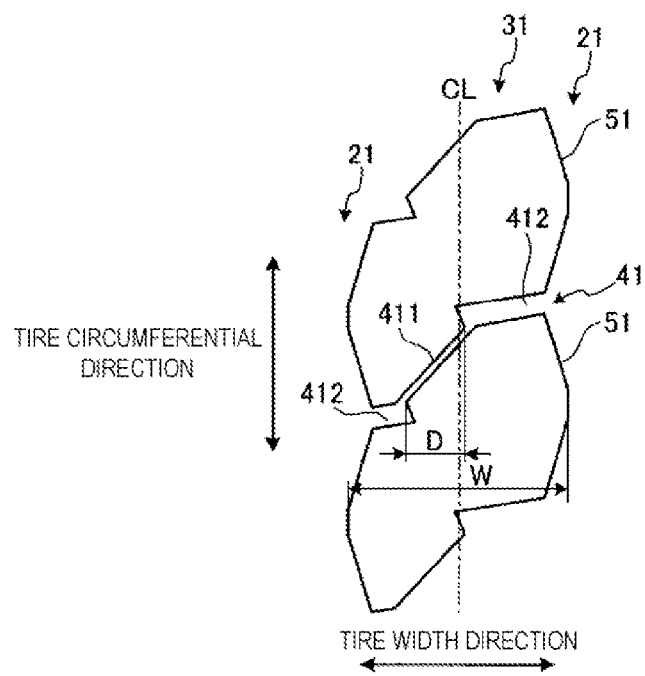
FIG. 5 is an explanatory view illustrating a modified example of the pneumatic tire depicted in FIG. 1.
Figure 6:
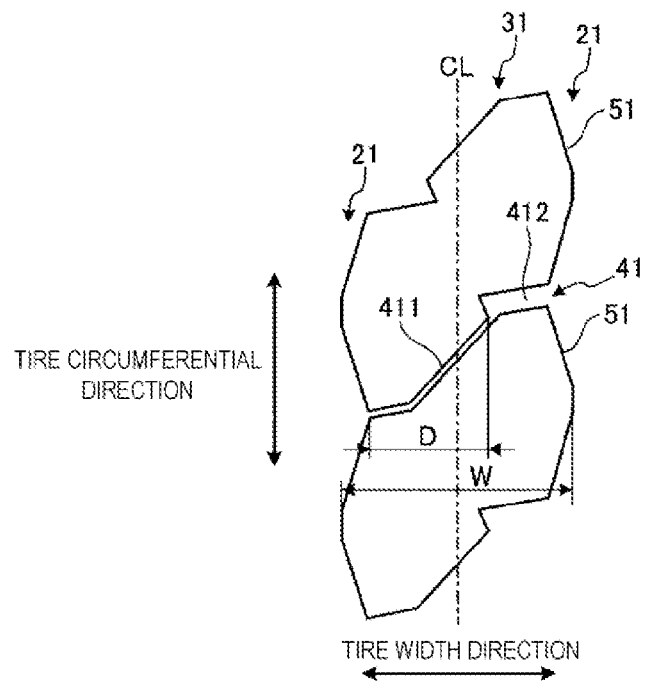
FIG. 6 is an explanatory view illustrating a modified example of the pneumatic tire depicted in FIG. 1.

FIGS. 5 and 6 are explanatory views illustrating modified examples of the pneumatic tire depicted in FIG. 1. In FIGS. 5 and 6, a pair of blocks 51, 51 that are adjacent in the center land portion 31 and a single lug groove 41 that is interposed between these blocks 51, 51 have been extracted.

In the configurations of FIGS. 2 and 3, the center of the first lug groove portion 411 extends the same length in the tire width direction centered on the point of intersection with the center line of the center land portion 31 (tire equatorial plane CL).

However, this is not a limitation, and as illustrated in FIG. 5, the first lug groove portion 411 may be disposed biased in one direction in the tire width direction with respect to the center line of the center land portion 31. Also, in this configuration, preferably, the first lug groove portion 411 is disposed so that it intersects the center line of the center land portion 31. In this configuration, when the first lug groove portion 411 is closed and the adjacent blocks 51, 51 become connected to each other during tire ground contact (see FIG. 4), the stiffness of the center land portion 31 is effectively increased, and the tire rolling resistance is reduced.

Also, in the configuration in FIG. 3, the lug grooves 41 have the second lug groove portions 412 at each opening into the left or right circumferential main grooves 21, 21. In this configuration, the left and right edge component of the center land portion is increased, which is desirable in terms of improving the tire snow braking performance.

However, this is not a limitation, and as illustrated in FIG. 6, the lug groove 41 may have the second lug groove portion 412 only at an opening into one of the tire circumferential grooves 21. In the configuration in FIG. 6, the first lug groove portion 411 opens to the other of the circumferential main grooves 21.

Figure 7:
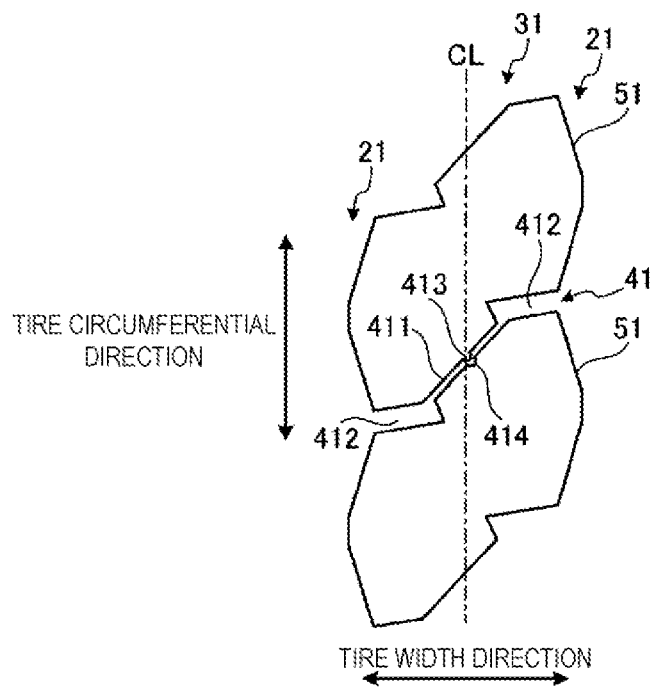
FIG. 7 is an explanatory view illustrating a modified example of the pneumatic tire depicted in FIG. 1.
Figure 8:
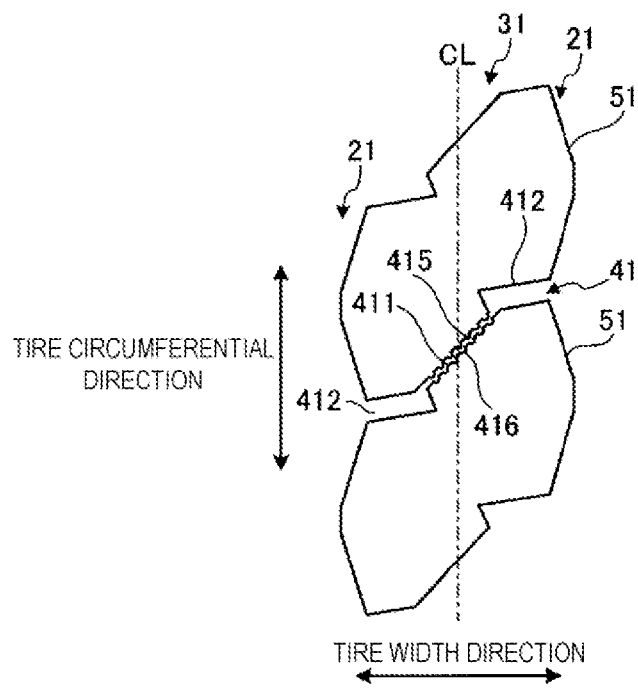
FIG. 8 is an explanatory view illustrating a modified example of the pneumatic tire depicted in FIG. 1.

FIGS. 7 and 8 are explanatory views illustrating modified examples of the pneumatic tire depicted in FIG. 1. In FIGS. 7 and 8, a pair of blocks 51, 51 that are adjacent in the center land portion 31 and a single lug groove 41 that is interposed between these blocks 51, 51 have been extracted.

In the configuration of FIG. 3, the first lug groove portion 411 of the lug groove 41 has groove wall surfaces with a straight line shape. In this configuration, when the first lug groove portion 411 is closed during tire ground contact, planar contact occurs between the left and right groove wall surfaces of the first lug groove portion 411, and the adjacent blocks 51, 51 become connected to each other (see FIG. 4).

In contrast, as illustrated in FIGS. 7 and 8, the opposing left and right groove walls of the first lug groove portion 411 may be configured to include protrusions and recesses 413 to 416, so that the protrusions and recesses 413 to 416 engage with each other during ground contact of the blocks 51. For example, in the configuration of FIG. 7, the first lug groove portion 411 includes a protrusion 413 on one of the groove wall surfaces and a recess 414 on the other of the groove wall surfaces, and the protrusion and recess 413, 414 are configured so that they engage with each other during ground contact of the block 51. Also, in the configuration of FIG. 8, the first lug groove portion 411 has protrusions and recesses 415, 416 with a zigzag shape on the left and right groove wall surfaces, and the protrusions and recesses 415, 416 are configured so that they engage with each other during ground contact of the blocks 51. According to these configurations, when the first lug groove portion 411 is closed and the adjacent blocks 51, 51 become connected to each other during tire ground contact (see FIG. 4), the stiffness of the center land portion 31 is effectively increased, and the rolling resistance of the tire is reduced.

Effect

As described above, the pneumatic tire 1 includes the plurality of circumferential main grooves 21 and 22 extending in the tire circumferential direction, and the plurality of land portions 31 to 33 partitioned by the circumferential main grooves 21 and 22 (see FIG. 2). Also, at least one row of land portions 31 includes the plurality of lug grooves 41 that pass through the land portion 31 in the tire width direction and is disposed at predetermined intervals in the tire circumferential direction, and the plurality of blocks 51 partitioned by the lug grooves 41. Also, the lug groove 41 includes the first lug groove portion 411 and at least one second lug groove portion 412 that opens into one of the circumferential main grooves 21 (see FIG. 3). Also, the groove width b of the first lug groove portion 411 and the groove width B of the second lug groove portion 412 have the relationship of 2.0 mm≤b≤5.0 mm and of b<B (see FIG. 3). Also, these groove widths b, B are within ranges such that when the blocks 51 contact the ground, the first lug groove portion 411 is closed, but the second lug groove portion 412 is not closed but remains open (see FIG. 4).

In this configuration, the first lug groove portion 411 has the narrow groove width b, so when the blocks 51 contacts the ground, the first lug groove portion 411 is closed and the blocks 51 become connected in the tire circumferential direction (see FIG. 4). Accordingly, the stiffness in the tire circumferential direction of the center land portion 31 increases, and the tire rolling resistance is reduced. On the other hand, the wide second lug groove portion 412 is disposed at the edge of the center land portion 31, so the edge component of the center land portion 31 is ensured, and the tire snow braking performance is ensured. Accordingly, there is the advantage that both the tire rolling resistance performance and the snow braking performance are achieved.

In particular, in this configuration, the lug groove 41 that passes through the land portion 31 in the tire width direction includes the first lug groove portion 411 and the second lug groove portion 412 described above, which has the advantage that the tire rolling resistance performance and the snow braking performance are effectively improved. For example, in a configuration (not illustrated on the drawings) having a circumferential narrow groove extending in a zigzag manner in the tire circumferential direction, even though, in an intermediate period of wear, the circumferential narrow groove could be closed during ground contact of the land portion, after the intermediate period of wear, the circumferential zigzag groove would not be closed, and the size of the individual blocks from which the center land portion is configured would become comparatively small, so there would be a problem of the occurrence of rapid wear of the center portion and uneven wear in the center portion blocks.

Also, in this configuration, the groove width b of the first lug groove portion 411 is made appropriate, so the tire rolling resistance performance and snow braking performance are improved. Also, this has the advantage that uneven wear in the land portion 31 is reduced and the uneven wear resistance performance of the tire is improved. In other words, by satisfying the relationship 2.0 mm≤b, the snow braking performance is appropriately ensured, and by satisfying the relationship b≤5.0 mm, the rolling resistance performance and uneven wear resistance performance are appropriately ensured.

Also, in the pneumatic tire 1 according to the present technology, the groove width B of the second lug groove portion 412 is within the range of 5.0 mm≤B≤10.0 mm (see FIG. 3). In this configuration, the groove width B of the second lug groove portion 412 is made appropriate, which has the advantage that the tire rolling resistance performance, the snow braking performance, and the uneven wear resistance performance are all achieved. In other words, by satisfying the relationship 5.0 mm≤B, the snow braking performance is appropriately ensured, and by satisfying the relationship B≤10.0 mm, the rolling resistance performance and the uneven wear resistance performance are appropriately ensured.

Also, in the pneumatic tire 1, a single block 51 is partitioned by the pair of circumferential main grooves 21, 21 that are adjacent in the tire width direction, and the pair of lug grooves 41, 41 that are adjacent in the tire circumferential direction (see FIG. 2). Also, the land portion 31 is formed by the plurality of blocks 51 arranged as a row in the tire circumferential direction. In this configuration, the land portion 31 is formed by the blocks 51 that are partitioned by the left and right circumferential main grooves 21, 21 arranged as a row in the tire circumferential direction, and the lug grooves 41 are disposed between each block 51, 51 and open into the left and right circumferential main grooves 21, 21. The lug groove 41 of the land portion 31 includes the first lug groove portion 411 and the second lug groove portion 412, which has the advantage that the tire rolling resistance performance and the snow braking performance are effectively improved. For example, in a configuration (not illustrated on the drawings) in which the land portions are divided in the tire width direction by a circumferential narrow groove, even though the circumferential narrow groove is closed during ground contact of the land portion, the stiffness of that land portion in the tire circumferential direction is not sufficient, so the tire rolling resistance performance cannot be sufficiently obtained, which is not desirable.

Also, in the pneumatic tire 1, the first lug groove portion 411 is disposed intersecting the center line of the block 51 (in FIG. 3, the tire equatorial plane CL) (see FIG. 3). In this configuration, during ground contact of the land portion 31, the first lug groove portion 411 is closed, so the adjacent blocks 51, 51 are connected at the center line of the block 51 (see FIG. 4). Accordingly, the stiffness of the land portions 31 is effectively increased, which has the advantage that the rolling resistance performance is improved.

Also, in the pneumatic tire 1, the angle of inclination α of the first lug groove portion 411 with respect to the tire width direction is within the range of 25 (deg)≤α≤65 (deg) (see FIG. 3). In this configuration, the angle of inclination α of the first lug groove portion 411 is made appropriate, which has the advantage that the tire rolling resistance performance and the tire uneven wear performance are both achieved. In other words, by satisfying the relationship 25 degrees≤α, the uneven wear resistance performance is appropriately ensured. Also, by satisfying the relationship α≤65 degrees, the rolling resistance performance and the uneven wear resistance performance are appropriately ensured.

Also, in the pneumatic tire 1, the distance D in the tire width direction of the first lug groove portion 411 and the width W of the block 51 have the relationship of 0.2≤D/W≤0.6 (see FIG. 3). In this configuration, the ratio D/W is made appropriate, which has the advantage that the tire uneven wear resistance performance and the snow braking performance are both achieved. In other words, satisfying the relationship 0.2≤D/W has the advantage that the uneven wear resistance performance is appropriately ensured, and satisfying the relationship D/W≤0.6 has the advantage that the snow braking performance is appropriately ensured.

Also, in the pneumatic tire 1, the angle of inclination β of the second lug groove portion 412 with respect to the tire width direction is within the range of 0 (deg)≤β≤25 (deg) (see FIG. 3). In this configuration, the angle of inclination β of the second lug groove portion 412 is made appropriate, which has the advantage that the tire uneven wear resistance performance is appropriately ensured.

Also, in the pneumatic tire 1, the first lug groove portion 411 includes protrusions and recesses 413 to 416 disposed on the opposing left and right groove walls thereof and that engage with each other upon ground contact of the blocks 51 (see FIGS. 5 to 8). In this configuration, by providing the protrusions and recesses 413 to 416 in the groove walls of the first lug groove portion 411, when the first lug groove portion 411 is closed during ground contact of the land portion 31, the adjacent blocks 51, 51 are strongly connected to each other. This has the advantage that the uneven wear resistance performance of the tire is improved.

EXAMPLES

FIGS. 9A-9B and 10A-10B are tables showing the results of performance testing of pneumatic tires according to the embodiment of the present technology.

In this performance testing, (1) rolling resistance performance, (2) snow braking performance, and (3) uneven wear resistance performance were evaluated for a plurality of different pneumatic tires (see FIGS. 9A-9B and 10A-10B). In these performance tests, pneumatic tires having a tire size of 275/80R22.5 were assembled on a standard rim of rim size 7.50×22.5, inflated to the maximum air pressure and the maximum load stipulated by JATMA was applied to the pneumatic tires.

(1) Evaluations related to rolling resistance performance were conducted by using a drum testing machine of drum diameter of 1707 mm to measure resistance force at a speed of 80 km/h. Results of the evaluations were indexed and the index value of the pneumatic tire of the conventional examples was set as the standard score (100). Higher scores were preferable. An index evaluation of 103 or higher was considered as superior.

(2) Evaluations related to the snow braking performance were conducted when driving a test vehicle on which the pneumatic tires were assembled over a snowy road surface at a snowy road test site, and the braking distance from a traveling speed of 40 km/h was measured. Based on the measurement results, index evaluation was carried out, using conventional examples as standards (100). In these evaluations, higher scores were preferable. An index evaluation of 103 or higher was considered as superior.

(3) Evaluations relating to the uneven wear resistance performance were conducted by driving a test vehicle on which the pneumatic tires were assembled over a paved surface for 100,000 km, and after completion, the uneven wear that occurred in the center land portion was evaluated visually. Results of the evaluations were indexed and the index value of the pneumatic tire of the conventional examples was set as the standard score (100). Higher scores were preferable. An index evaluation of 103 or higher was considered as superior.

The pneumatic tires 1 of Working Example 1 to 16 had the configuration illustrated in FIGS. 1 to 3. Also, the groove width of the circumferential main grooves 21 was 9.0 mm, and the groove depth was 16.0 mm. Also, the width W of the blocks 51 was 65.0 mm.

The pneumatic tires according to Conventional Examples 1 to 4 had a uniform groove width (b=B) of the lug grooves 41 in the configuration of FIGS. 1 to 3. Specifically, in Conventional Examples 1 and 2, the lug groove 41 was a sipe, and in Conventional Examples 3 and 4, the lug groove 41 had a wide structure.

As can be seen from the test results, with the pneumatic tires according to Working Examples 1 to 16, the tire rolling resistance performance and snow braking performance were both achieved. In addition, it can be seen that the uneven wear resistance performance was improved by making the predetermined values appropriate.

What is claimed is:

1. A pneumatic tire, comprising: four or more circumferential main grooves extending in a tire circumferential direction; and five or more land portions partitioned by the circumferential main grooves,
    a center land portion is defined as the land portion disposed on a tire equatorial plane, or the land portion partitioned by the circumferential main groove disposed on the tire equational plane,
    the center land portion includes a plurality of lug grooves that pass through the center land portion in a tire width direction and is disposed at predetermined intervals in the tire circumferential direction, and a plurality of blocks partitioned by the plurality of lug grooves,
    the lug grooves including a first lug groove portion, and at least one second lug groove portion that opens into one of the circumferential main grooves,
    a groove width b of the first lug groove portion and a groove width B of the second lug groove portion having relationships of 2.0 mm≤b≤4.0 mm and b<B, and being within ranges such that upon ground contact of the blocks, the first lug groove portions are closed and the second lug groove portions are not closed but remain open,
    the first lug groove portion and the second lug groove portion are inclined in a same direction with respect to the tire width direction,
    an angle of inclination α of the first lug groove portion and an angle of inclination β of the second lug groove portion have a relationship of α>β, and
    a groove depth H1 of the circumferential main grooves is in the range of 12 mm≤H1.

2. The pneumatic tire according to claim 1, wherein the groove width B of the second lug groove portion is within the range of 5.0 mm≤B≤10.0 mm.

3. The pneumatic tire according to claim 1, wherein a single block is partitioned by a pair of circumferential main grooves that are adjacent in the tire width direction and a pair of lug grooves that are adjacent in the tire circumferential direction, and the land portion is formed by arranging a plurality of the blocks in a row in the tire circumferential direction.

4. The pneumatic tire according to claim 1, wherein the first lug groove portion is disposed intersecting with a center line of the blocks.

5. The pneumatic tire according to claim 1, wherein an angle of inclination α with respect to the tire width direction of the first lug groove is within a range of 25°≤α≤65°.

6. The pneumatic tire according to claim 1, wherein a distance D in the tire width direction of the first lug groove portion and a width W of the block have the relationship of 0.2≤D/W≤0.6.

7. The pneumatic tire according to claim 1, wherein an angle of inclination β with respect to the tire width direction of the second lug groove portion is within a range of 0°≤β≤25°.

8. The pneumatic tire according to claim 1, wherein the first lug groove portion includes protrusions and recesses disposed on opposing left and right groove walls and that engage with each other upon ground contact of the blocks.

9. The pneumatic tire according to claim 2, wherein a single block is partitioned by a pair of circumferential main grooves that are adjacent in the tire width direction and a pair of lug grooves that are adjacent in the tire circumferential direction, and the land portion is formed by arranging a plurality of the blocks in a row in the tire circumferential direction.

10. The pneumatic tire according to claim 2, wherein the first lug groove portion is disposed intersecting with a center line of the blocks.

11. The pneumatic tire according to claim 2, wherein an angle of inclination α with respect to the tire width direction of the first lug groove is within a range of 25°≤α≤65°.

12. The pneumatic tire according to claim 3, wherein an angle of inclination α with respect to the tire width direction of the first lug groove is within a range of 25°≤α≤65°.

13. The pneumatic tire according to claim 4, wherein an angle of inclination α with respect to the tire width direction of the first lug groove is within a range of 25°≤α≤65°.

14. The pneumatic tire according to claim 2, wherein a distance D in the tire width direction of the first lug groove portion and a width W of the block have the relationship of 0.2≤D/W≤0.6.

15. The pneumatic tire according to claim 3, wherein a distance D in the tire width direction of the first lug groove portion and a width W of the block have the relationship of 0.2≤D/W≤0.6.

16. The pneumatic tire according to claim 4, wherein a distance D in the tire width direction of the first lug groove portion and a width W of the block have the relationship of 0.2≤D/W≤0.6.

17. The pneumatic tire according to claim 2, wherein an angle of inclination β with respect to the tire width direction of the second lug groove portion is within a range of 0°≤β≤25°.

18. The pneumatic tire according to claim 3, wherein an angle of inclination β with respect to the tire width direction of the second lug groove portion is within a range of 0°≤β≤25°.

19. The pneumatic tire according to claim 2, wherein the first lug groove portion includes protrusions and recesses disposed on opposing left and right groove walls and that engage with each other upon ground contact of the blocks.

20. The pneumatic tire according to claim 3, wherein the first lug groove portion includes protrusions and recesses disposed on opposing left and right groove walls and that engage with each other upon ground contact of the blocks.

21. The pneumatic tire according to claim 1, wherein the angle of inclination α with respect to the tire width direction of the first lug groove is within a range of 45°≤α≤65°.

22. The pneumatic tire according to claim 1, wherein the groove width b of the first lug groove portion is within a range of 2.0 mm≤b≤3.5 mm.

23. A pneumatic tire, comprising: four or more of circumferential main grooves extending in a tire circumferential direction; and five or more of land portions partitioned by the circumferential main grooves, a center land portion is defined as the land portion disposed on a tire equatorial plane, or the land portion partitioned by the circumferential main groove disposed on the tire equational plane, the center land portion includes a plurality of lug grooves that pass through the center land portion in a tire width direction and is disposed at predetermined intervals in the tire circumferential direction, and a plurality of blocks partitioned by the plurality of lug grooves, the lug grooves of the center land portion including a first lug groove portion, and at least one second lug groove portion that opens into one of the circumferential main grooves, a groove width b of the first lug groove portion and a groove width B of the second lug groove portion having relationships of 2.0 mm≤b≤5.0 mm and b<B, and being within ranges such that upon ground contact of the blocks, the first lug groove portions are closed and the second lug groove portions are not closed but remain open, the first lug groove portion and the second lug groove portion are inclined in a same direction with respect to the tire width direction, an angle of inclination α of the first lug groove portion and an angle of inclination β of the second lug groove portion have a relationship of α>β, a pair of left and right second land portions are defined as the land portions disposed outside of the center land portion in the tire width direction, each of the second land portions includes a plurality of lug grooves that pass through the second land portion in a tire width direction and is disposed at predetermined intervals in the tire circumferential direction, and a plurality of blocks partitioned by the plurality of lug grooves, and upon ground contact of the blocks, the lug grooves of the second land portion are not closed but remain open.

24. A pneumatic tire, comprising: a plurality of circumferential main grooves extending in a tire circumferential direction; and a plurality of land portions partitioned by the circumferential main grooves, the land portion in at least one row includes a plurality of lug grooves that pass through the land portion in a tire width direction and is disposed at predetermined intervals in the tire circumferential direction, and a plurality of blocks partitioned by the plurality of lug grooves, the lug grooves including a first lug groove portion, and at least one second lug groove portion that opens into one of the circumferential main grooves, the first lug groove portion including protrusions and recesses disposed on opposing left and right groove walls that engage with each other upon ground contact of the blocks a groove width b of the first lug groove portion and a groove width B of the second lug groove portion having relationships of 2.0 mm≤b≤5.0 mm and b<B, and being within ranges such that upon ground contact of the blocks, the first lug groove portions are closed and the second lug groove portions are not closed but remain open, the first lug groove portion and the second lug groove portion are inclined in a same direction with respect to the tire width direction, and an angle of inclination α of the first lug groove portion and an angle of inclination β of the second lug groove portion have a relationship of α>β.

* * * * *